A. STUBER.
REGISTERING MECHANISM.
APPLICATION FILED JAN. 2, 1920.

1,433,310.

Patented Oct. 24, 1922.

INVENTOR.
Adolph Stuber
BY
his ATTORNEY

A. STUBER.
REGISTERING MECHANISM.
APPLICATION FILED JAN. 2, 1920.

1,433,310.

Patented Oct. 24, 1922.
9 SHEETS—SHEET 2.

INVENTOR.
Adolph Stuber
BY
his ATTORNEY

A. STUBER.
REGISTERING MECHANISM.
APPLICATION FILED JAN. 2, 1920.

1,433,310.

Patented Oct. 24, 1922.

INVENTOR.
Adolph Stuber
BY
his ATTORNEY

Patented Oct. 24, 1922.

1,433,310

UNITED STATES PATENT OFFICE.

ADOLPH STUBER, OF ROCHESTER, NEW YORK.

REGISTERING MECHANISM.

Application filed January 2, 1920. Serial No. 348,779.

*To all whom it may concern:*

Be it known that I, ADOLPH STUBER, of Rochester, in the county of Monroe and State of New York, have invented certain new and useful Improvements in Registering Mechanisms; and I do hereby declare the following to be a full, clear, and exact description of the same, reference being had to the accompanying drawings, forming a part of the specification, and to the reference characters marked thereon.

This invention relates to registering mechanisms of a character especially adapted for use in conjunction with internal combustion motors having a fuel supply system operated by varying pressure conditions, for registering the fuel consumption of the motor, one object of the invention being the provision of an improved mechanism of the above character for automatically and accurately registering various data as to the fuel consumption, which may include the amount of fuel consumed, the rate of consumption and the amount of fuel remaining in the reservoir.

Another object is to provide mechanism of the above character for registering a ratio between the amount of work performed by the motor and the corresponding amount of fuel consumed, thus affording useful indication of the efficiency of the motor, of the condition of adjustment of its carburetor and other parts, and of the quality of the fuel used, as well as other advantageous features.

Another object is the provision in a mechanism of the above character of adjustable means for selectively varying one of the elements of such ratio, as convenience may require, as for example, the unit of fuel employed to determine the ratio, where the mechanism is used with an automobile to register the rate of miles travelled per gallon of fuel consumed.

A further object is to provide a mechanism of this character conveniently and economically combined with other indicating mechanisms commonly employed under similar circumstances, as for example, those indicating the speed and mileage.

Still a further object is the provision of various advantageous features of construction and operation which will be pointed out hereinafter.

To these and other ends the invention consists in certain improvements and combinations of parts, all as will be hereinafter more fully described, the novel features being pointed out in the claims at the end of the specification.

In the drawings:

Figure 22ª is a sectional view on the line 22ª—22ª of Figure 13;

Figure 22ᵇ is a sectional view on the line 22ᵇ—22ᵇ of Figure 13;

Similar reference numerals throughout the several views indicate the same parts.

The embodiment of the invention at present preferred as best illustrating the principles involved is adapted for use with an automobile for indicating the rate of fuel consumption, the amount of fuel consumed and also the amount of fuel remaining in the reservoir, this mechanism being conveniently and economically combined with the usual mechanism for indicating speed and the mileage travelled. In the present instance, the rate of fuel consumption is for convenience uniformly expressed as the ratio of the number of miles travelled for each gallon of fuel consumed, but this ratio may be determined and indicatel upon the consumption of each successive tenth of a gallon or of each whole gallon, as may be found more suitable, convenient means being provided for shifting selectively from the use of one of these units of measure and corresponding periods of indication to the other.

Figure 1:
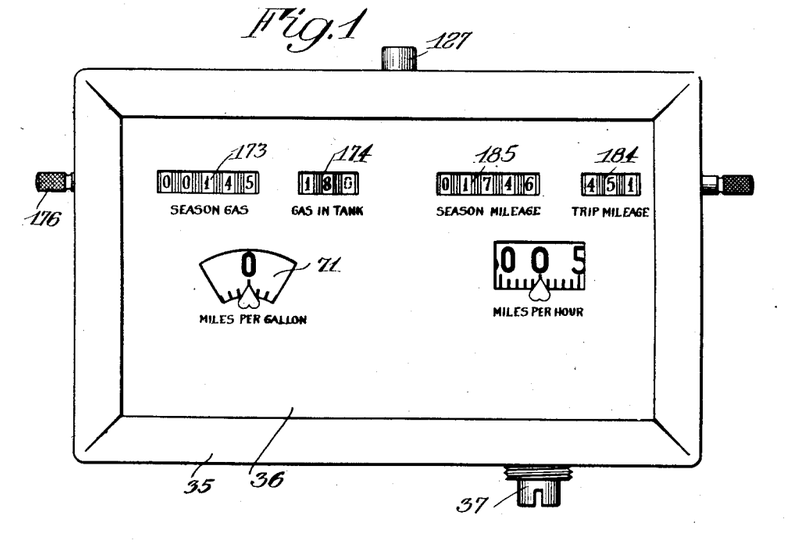
Figure 1 is an outside face view of a registering mechanism embodying the present invention.
Figure 2:
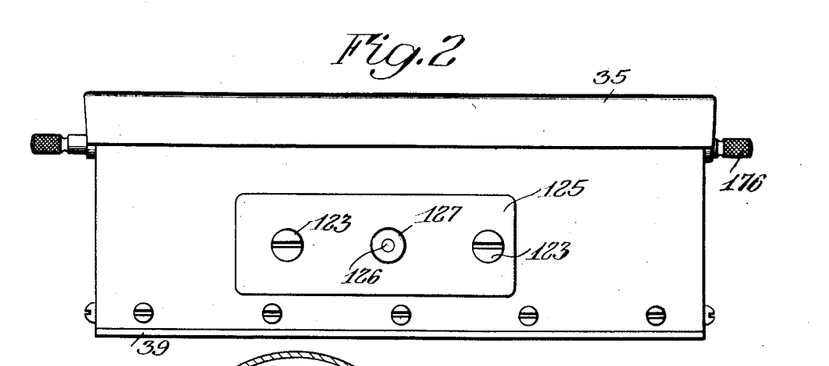
Figure 2 is a top view of the same.

Referring more particularly to the drawings, numeral 35, Figure 1, indicates the casing enclosing the instrument which is adapted to be located on the instrument board of the vehicle, having a face portion 36 provided with suitable apertures through which the dials of the various registering mechanisms are visible. At the left are the dials of the mechanism embodying the present invention, while at the right are shown the dials of the usual speed and mileage mechanisms, the numeral 37 indicating the usual spindle projecting from the latter mechanisms for the connection thereof with a rotating part of the vehicle as, for example, the engine shaft, so as to be driven thereby. Spindle 37 is rotatably supported in a bearing 38, Figure 5, mounted on the base plate 39 of the instrument casing. A short shaft 40 is driven by a suitably geared connection with spindle 37, being rotatably supported in the bearing 38 of the latter and a bearing 41 extending upwardly from the base plate, and shaft 40 carries a worm 40ª meshing with a worm wheel 42 on a shaft 43 rotatably supported on the base and extending transversely of the latter adjacent the opposite side of which it has fixed thereon a worm 44 driving a worm wheel 45 fixed on a shaft 46 journaled in suitable bearings on the base. Shaft 46 is preferably connected by a change speed gearing indicated generally at 47, and described in detail hereafter, with a shaft 47ª journaled in bearings in the base and having fixed thereon a gear wheel 48 driving a gear wheel 48ª fixed on a shaft 49 supported at the end adjacent the gear by a trunnion projecting from the end of the shaft into a bearing in a pedestal 50 extending upwardly from and rotatably supported on the base to permit a swinging movement of the shaft. The opposite end of shaft 49 is provided with a trunnion 51 journaled in an angular lever 52, Figure 12, pivotally supported by a pin or screw 53 on a block 54 stationarily supported by means described hereinafter on the base. Shaft 49 forms a driving means for the mechanism for registering and indicating the ratio of mileage to fuel consumed, which will now be described.

Figure 5:
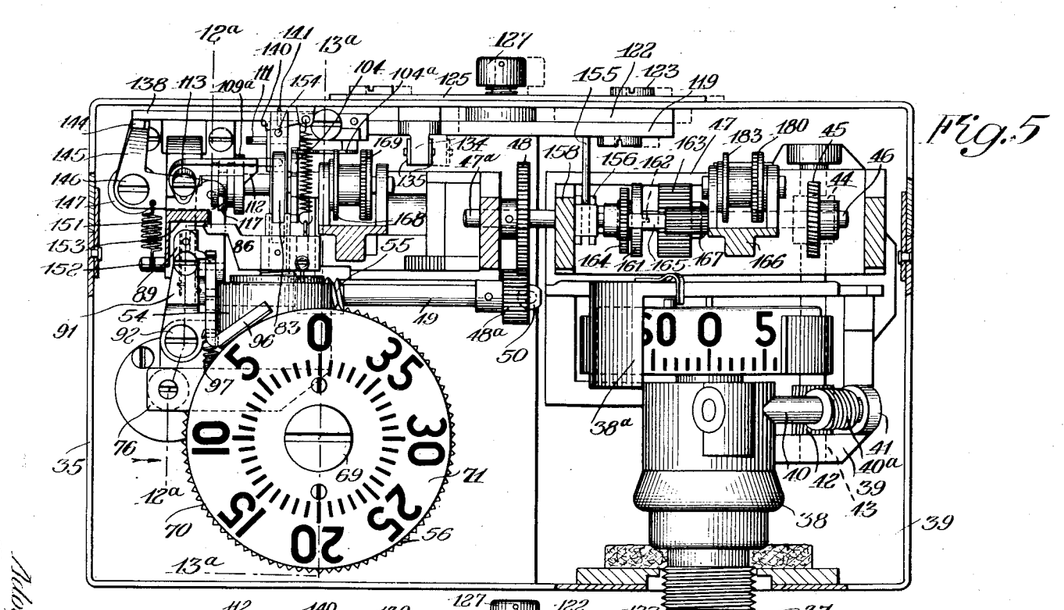
Figure 5 is a face view of the mechanism with the front of the casing and some of the indicating devices removed.
Figure 6:
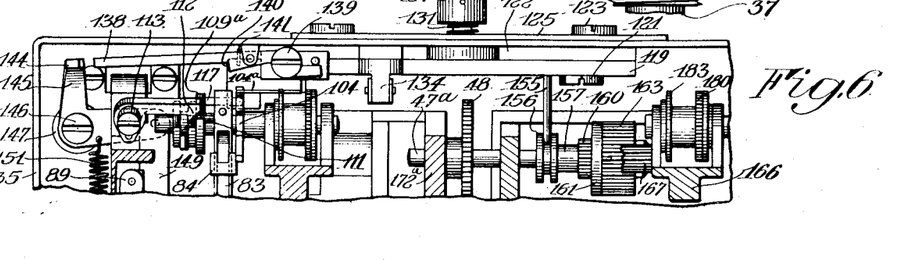
Figure 6 is a fragmentary view illustrating some of the parts shown in Figure 5 but in a different operating position.
Figure 9:
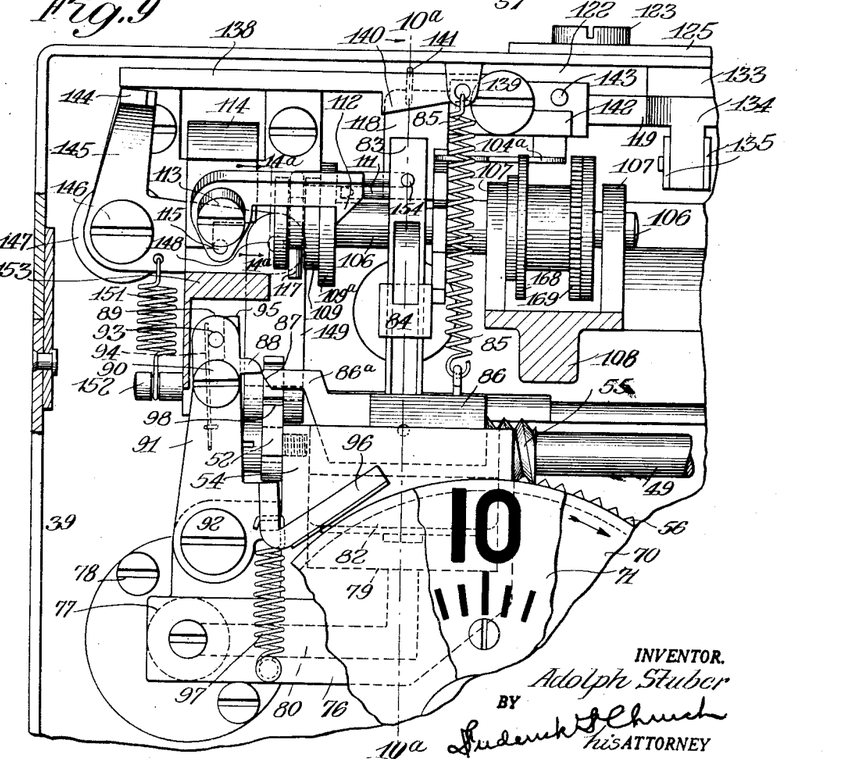
Figure 9 is a similar view but enlarged to better illustrate the details of the mechanism.
Figure 13:
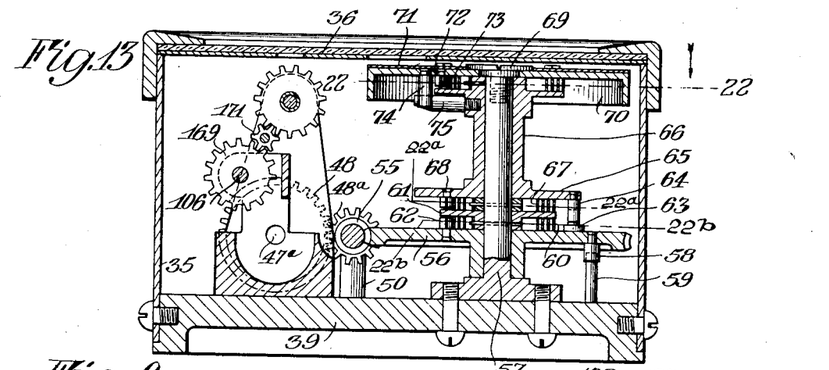
Figure 13 is a section on the line 13ª—13ª of Figure 5.
Figure 23:
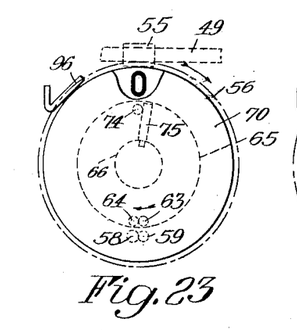
Figures 23 to 31 inclusive are diagrammatic views illustrating successive operating positions of the parts of the ratio indicating mechanism shown in Figure 13.

Shaft 49 preferably has fixed thereon a worm 55, Figures 9 and 13, meshing with a worm wheel 56 rotatably supported on a post 57 bolted at its lower end to the base. Gear 56 has fixed thereto and depending from its lower side a pin 58 adapted in the rotation of the gear to strike a stationary stop pin 59 on the base, the initial or zero position of the gear being determined by the engagement of these pins as illustrated in Figures 13 and 23. A spring 60 fixed at one end to the stationary hub of a keeper plate 61 fixed on post 57, has its opposite end fixed at 62 to the upper side of the gear, this spring tending to rotate and return the gear to initial position with pins 58 and 59 in contact. Fixed on the upper side of gear 56 is a pin 63 with which is adapted to engage a pin 64 fixed on and depending from a disc 65 fixed to a sleeve 66 rotatable on post 57. A spring 67 is fixed at one end, 68, to the disc and at its opposite end to the stationary post 57, this spring tending to rotate and return the disc and its sleeve to initial position with the pin 64 of the disc in contact with pin 63 of gear 56. Rotatably carried at the upper end of sleeve 66 and retained thereon by a screw 69 is a flanged disc 70 having fixed on its side adjacent the face of the instrument casing a dial plate 71 inscribed with a suitable scale and figures as shown in Figure 5, these being visible through an opening in the face plate. Fixed to disc 70 is one end 72 of a spring 73 fixed at its other end to sleeve 63, the disc having fixed thereto a depending pin 74 arranged to engage a horizontally projecting pin 75 carried by the sleeve, the function of spring 73 being to rotate the disc on the sleeve so as to urge pin 74 into engagement with pin 75.

Figure 24:
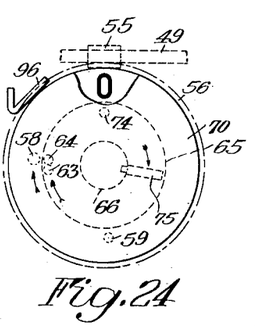
Figure 25:
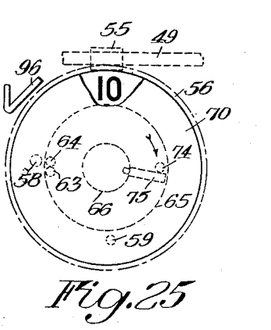
Figure 26:
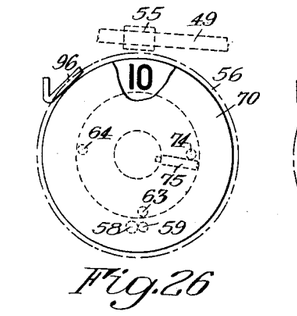

It is apparent from the above construction that as shaft 49 and its driving member or worm 55 are rotated in the proper direction by the means described as connecting it with a moving part of the vehicle, the controller or gear 56 will be rotated in the direction indicated in the drawings to move pin 58 from its initial position in engagement with the stationary pin or stop 59, as indicated in Figure 24, thereby rotating the setting member or disc 65 and its sleeve 66 in the same direction, due to the engagement of pin 63 with pin 64 of the latter. Sleeve 66 tends to rotate the indicator or disc 70 also in the same direction through the spring connection 73 between these parts, as indicated in Figures 24 and 25, dial 71 being thus moved to an indicating position. The mechanism comprises a fuel measuring device, and means described hereinafter, comprising a brake shoe 96, are provided for engaging the flanged periphery of disc 70 as the consumption of each fuel unit is completed for retaining it in an indicating position, and with disc 70 thus held in position it is apparent that by rocking shaft 49 to disengage its worm from gear 56, the latter is permitted to be returned by its spring 60 to initial position, sleeve 66 and its disc 67, however, being held in the position of setting by the pin 74 of disc 70, as indicated in Figure 26. Worm 55 being then reengaged with gear 56 as the consumption of a new unit of fuel begins, rotates the latter to a new position of setting corresponding to the number of miles traveled during the consumption of the unit of fuel, gear 56 being thus released by worm 55 through means later to be described so as to be returned to initial position as each succeeding unit of fuel is consumed and being rotated or reset to a new position corresponding to the mileage accomplished during the consumption of such unit.

Figure 27:
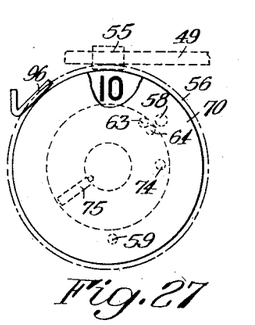
Figure 28:
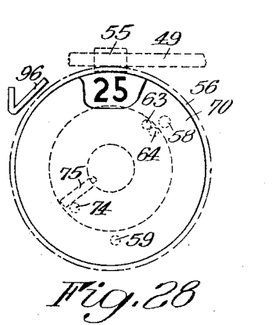
Figure 29:
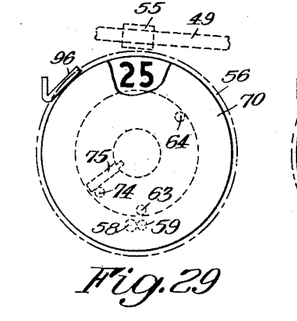
Figure 30:
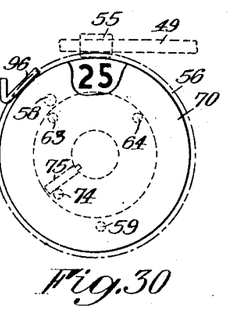
Figure 31:
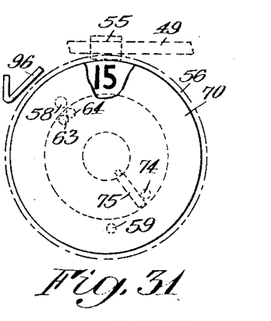

Should gear 56, in such setting movement thereof, exceed its previous setting, its pin 63 picks up pin 64 of sleeve 66, rotating the latter and carrying its pin 75 beyond pin 74 of disc 70 which is still held stationary by the brake 96, as indicated in Figure 27. Release of disc 70 by the brake 96 when the fuel unit has been consumed then permits the disc to be rotated by spring 73 to a new position of setting with its pin 74 in engagement with pin 75 of the sleeve, as indicated in Figure 28, after which the disc is reengaged by the brake shoe and maintained in its new position of setting. Worm 55 is then disengaged from gear 56, as before, allowing the latter to return to initial position. As the succeeding unit of fuel is supplied to the motor, the gear is rotated to a new position of setting, as before, and should its new position, when the fuel unit is consumed, be not so advanced as the previous one, corresponding to a lower mileage accomplished, as indicated in Figure 30, sleeve 66 and disc 70, upon the release of the latter, fall back to the position of a new and lower setting indicated in Figure 31. In this manner gear 56 is rotated during the consumption of each unit of fuel an amount proportional to the mileage accomplished during the consumption of such unit, and discs 70 and its indicating dial are then released and set to a position determined by the position of gear 56, in which position the dial is clamped, and the gear is immediately released and returned to initial position for a new setting.

Figure 32:
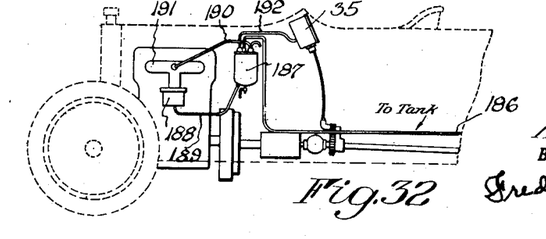
Figure 32 shows the application of the invention to a motor vehicle.

The mileage-fuel ratio registering gear 56 and its indicating disc 70 are controlled in the manner described above, preferably by means actuated by variations in pressure employed in the fuel feeding system, for drawing the fuel through piping 186, Figure 32, from the usual main fuel tank (not shown) into the auxiliary tank 187, Figure 32, from which it is fed by gravity to the motor carburetor 188 through piping 189. In a common form of such feeding mechanism, a vacuum is first formed in the auxiliary tank by a piping connection 190 with the engine manifold 191, to draw the fuel thereinto, after which the tank is opened to atmospheric pressure to permit gravity flow of the fuel to the carburetor. Such variations in pressure are particularly adapted to supply the motive force for the present invention in that they occur once each time the auxiliary tank is emptied and filled, or in other words, each time a given unit of fuel corresponding to the capacity of the tank is supplied to the motor. Such auxiliary tank may thus be used as a measuring device and may, of course, have any convenient capacity for that purpose, a capacity of one-tenth of a gallon being preferred as most suitable in the present instance, so that the unit of fuel on which the ratio is based is in the present embodiment one-tenth of a gallon, or a multiple thereof.

Figure 10:
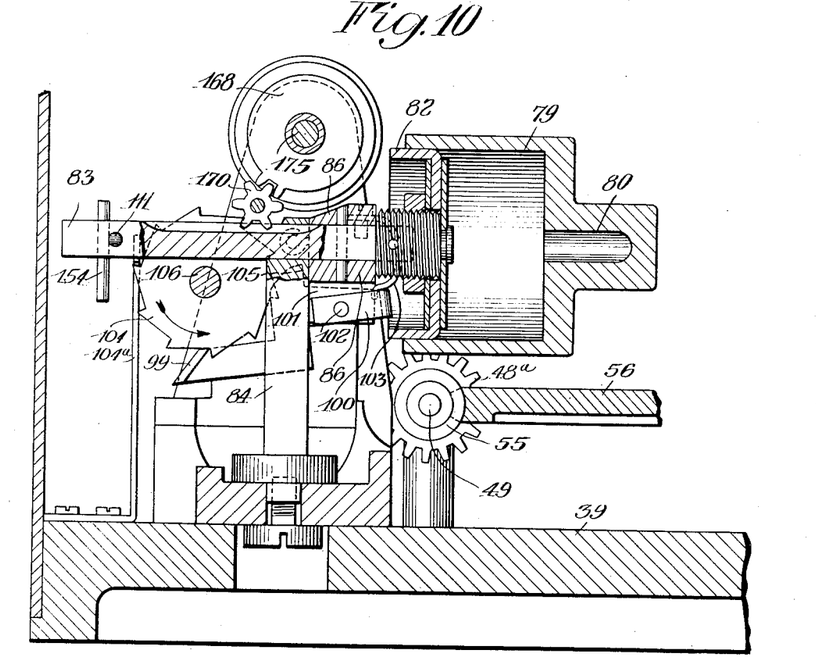
Figure 10 is a section on the line 10ª—10ª of Figure 9.
Figures 11, 12, 22A, 22B:
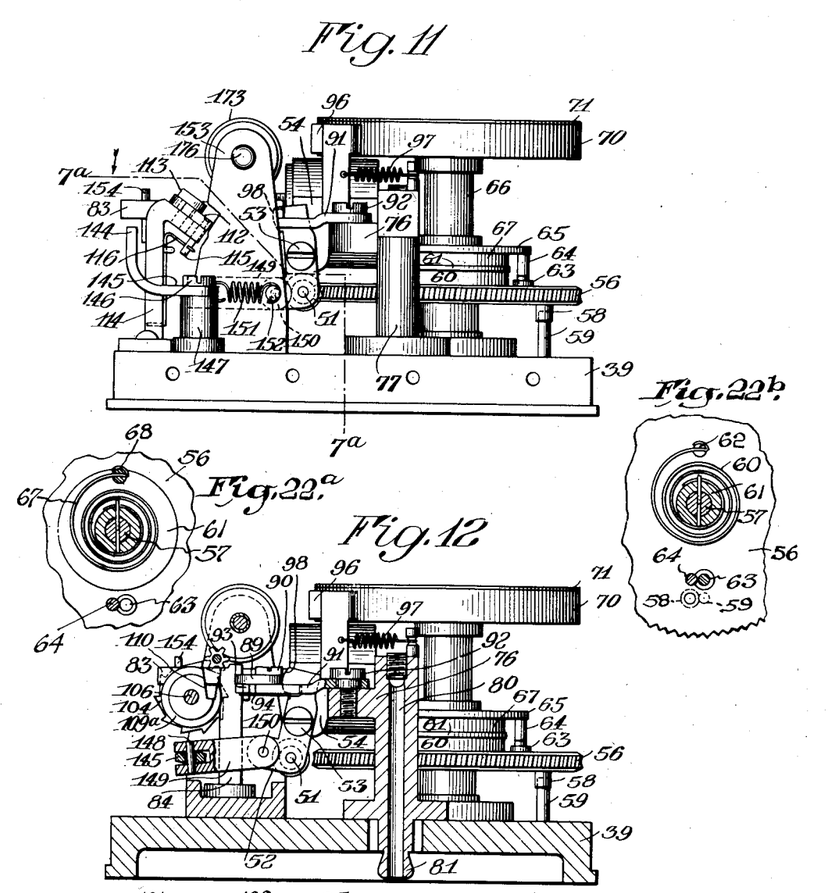
Figure 11 is an elevation of the mechanism from the left hand end as seen in Figure 9.
Figure 12 is a section on the line 12ª—12ª of Figure 5.

The means for utilizing the variations of pressure referred to comprises, preferably, the cylinder block 54 already described, which is supported on an overhanging arm 76, Figures 9, 11 and 12, projecting from the upper end of a pedestal 77 secured by means of bolts 78 to the base of the casing, the block having formed therein a cylinder 79, Figure 10, communicating by means of a conduit 80 passing through the arm and down the pedestal with a nipple 81 on the bottom of the base, to which a pipe line 192 may be conveniently attached so as to form a communication with the top of the auxiliary fuel feeding tank. Thus, when the contents of the tank have been supplied to the motor, and a vacuum is formed therein for the purpose of refilling the tank, this vacuum is transmitted to cylinder 79 and draws thereinto a piston 82 of any suitable construction which is exposed on its other side to atmospheric pressure. Fixed to the piston is a piston rod 83 slidably supported in a post 84 on the base, a spring 85, Figure 9, being secured at one end to the casing and at its other to the piston for moving the piston outwardly in the cylinder when the vacuum is broken in the auxiliary tank, so that the piston and its rod 83 are maintained in the outer position shown in Figure 10, except during the brief intervals in which a vacuum is created in the auxiliary tank and cylinder 79.

Fixed on the piston rod adjacent the piston, is, preferably, an irregular block 86, Figure 9, having an extension 86ª formed with a beveled surface 87, cooperating with a beveled lug 88 on a latch 89 pivotally secured by means of a pin or screw 90 to the end of a lever 91. The latter in turn is pivotally secured by means of a screw 92 on arm 76. Latch 89 has a depending pin 93 projecting between a spring 94 fixed on lever 91 and a lug 95 also fixed on the lever, from which construction it is apparent that as the piston rod moves inwardly the extension 86ª thereof, engaging lug 88, brings pin 93 into engagement with lug 95 of lever 91, and the beveled surfaces of the extension and lug are so formed as to swing lever 91 in an anti-clockwise direction, Figure 9, through a small angle until the extension passes inwardly of the lug. Lever 91 carries an angular arm forming a brake shoe 96, preferably provided with some frictional material, and arranged to be moved into engagement with the flange periphery of disc 70 by means of a spring 97 attached to the shoe and to the stationary arm 76. As the piston approaches its inner position in the cylinder, the brake shoe is thus swung clear of the disc for a brief interval and released, and returned into locking engagement therewith by spring 97. During the return outward stroke of the piston, latch 89 is permitted by spring 94 to turn idly on its pivot without affecting the brake shoe. At each inward stroke of the piston, therefore, disc 70 is released for an instant from the normal breaking action of shoe 96, to permit disc 70 and its dial 71 to be moved to a new position of setting as previously described.

The means for effecting the movement of the worm 55 toward and from worm gear 56, as described above, comprises, preferably, the lever 52 which is extended upwardly above its pivot and provided with a contact surface 98, Figures 9, 11 and 12, adapted to be engaged by extension 86ª of the piston in the inward position of the latter after it has released brake shoe 96 and permitted the latter to reengage and lock disc 70. This engagement of the piston extension with lever 52 at its upper end swings the lower end thereof, including shaft 49 and worm 55 away from gear 56, thus permitting the latter to return to its initial position for a new setting as previously described. As soon as the piston moves outwardly again, which occurs almost immediately, the worm is returned to driving engagement with the gear by a spring means described hereafter. Gear 56 is thus alternately engaged and rotated by worm 55 to position to determine the setting of the indicating disc 70 as the latter is momentarily released, and subsequently disengaged for an instant from the driving worm and permitted to return to initial position, when it is reengaged by the worm and driven to a new position for setting the indicating dial, as described above. This action would occur each time the auxiliary tank is filled and emptied, or in other words, each time a tenth of a gallon of fuel is consumed, except for the fact that it has been found convenient in some instances to obtain an indication of the above character on the consumption of a multiple of this unit, as, for example, a full gallon of fuel, and means are provided for restraining the indication, if so desired, until a full gallon has been consumed, including a convenient means for shifting selectively to the use of either of these units, which means will now be described.

Figure 15:
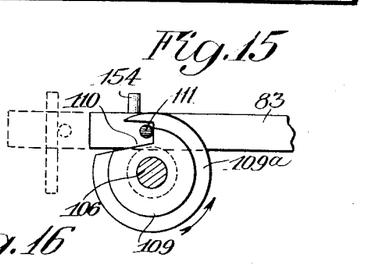
Figure 16:
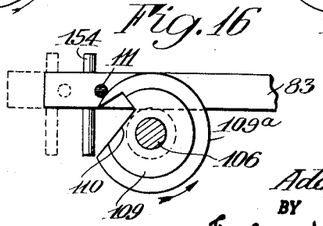

The means for varying the unit of fuel with which the mileage accomplished is to be compared comprises a pawl 99, Figure 10, having an angular portion 100 formed to embrace a lug 101 of the piston rod block 86 and pivotally supported thereon at 102. A spring 103 fixed at one end on the block bears at its other end on portion 100 of the pawl and urges the active end 99 of the latter into cooperation with a ratchet wheel 104, a shoulder 105 on the pawl being arranged to strike the surface of the piston rod block and to limit the cooperative action between the pawl and ratchet so that the latter is turned through the space of one tooth only regardless of the length of stroke of the piston rod. A spring detent 104ª is also provided for preventing reverse motion of the ratchet. The latter is fixed on a shaft 106 rotatably supported in bearings 107 of an upright 108 on the base, Figure 9. The shaft has also fixed thereon a sleeve 109 carrying a disc 109ª provided with a notch 110, Figures 14 to 16. Sleeve 109 is slidable on shaft 106 toward and from piston rod 83 and the latter is provided with a projecting pin 111 which, when sleeve 109 and its disc 109ª are adjacent the piston rod, is moved into contact with the periphery of the disc upon inward movement of the piston rod, thus limiting the movement of the latter in this direction, so that while it has a limited reciprocation each time a vacuum is formed in its cylinder, the movement is insufficient to effect release of either the indicating dial 70 or the worm gear 56 in the manner already described. Once in each complete rotation of shaft 106 and disc 109ᵃ, however, the notch 110 in the latter is moved into the path of pin 111 on the piston rod and the latter is permitted to have a full stroke and effect the ratio indication in the manner described. As ratchet wheel 104 is, in the present instance, provided with ten teeth, disc 109ᵃ, when in operation, effects an indication once for each ten reciprocations of the piston, or in other words, for each full gallon of fuel supplied to the motor.

Figure 14:
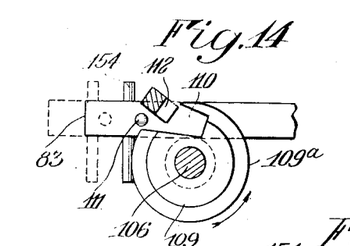
Figure 14, 15 and 16 are detailed views taken in section on the line 14ª—14ª of Figure 9, showing the parts in successive operating positions.

Sleeve 109 may, however, be moved toward the left in Figure 9 out of the path of pin 111 of the piston rod to permit a full reciprocating movement of the latter for each tenth of a gallon of fuel consumed, and a means is provided for retaining sleeve 109 in such position comprising a hook 112 engaging over the periphery of disc 109ᵃ, the hook being pivotally secured by means of a screw 113 on a post 114, Figure 11, and having a pin 115 engaging a spring 116 fixed on the post and serving to urge the hook into engagement with the periphery of the disc, for a purpose which will later appear. As shown in Figure 14, notch 110 in disc 109ᵃ is so formed that in the position in which it permits full movement of piston rod 111, it also releases hook 112, so that in this position of the disc it may be slid along shaft 106 toward the piston rod for cooperation with pin 111 in the manner described. The hook having a beveled end, does not interfere with movement of disc 109ᵃ and its sleeve 109 away from the piston rod.

Figure 17:
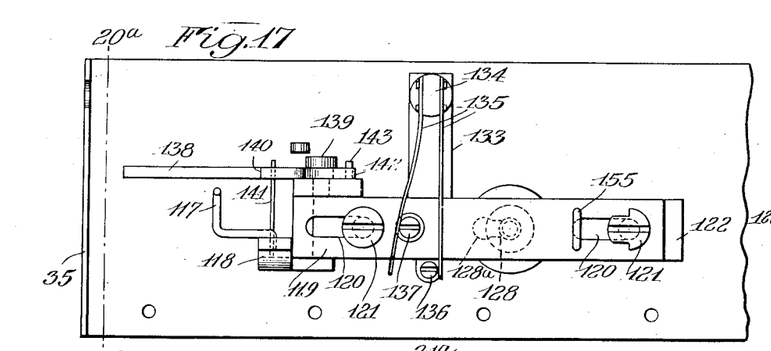
Figures 17 and 18 are views of the device for shifting from one unit of measure of fuel to another, carried on the inner side of the top of the casing and viewed from inside the latter, the parts being shown in different operating positions.
Figure 18:
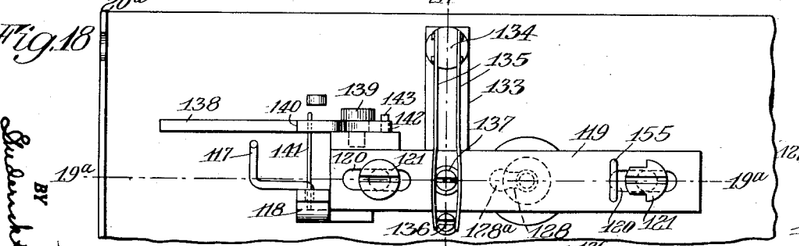

The means for sliding disc 109ᵃ on its shaft into and out of position for cooperation with the pin of the piston rod to determine the unit of fuel according to which the mileage indication is to be made, comprises a finger 117 engaging a recess in sleeve 109, the finger being fixed in a lug 118, carried by a plate 119, provided with slots 120 at each end embracing screws 121 fixed in a second plate 122. The latter carries screws 123 sliding in slots 124 in the walls of the casing 35, the heads of the screws closely engaging, however, in openings in a plate 125 which is located outside the casing and carries a short spindle 126. The latter has fixed on its outer end a finger piece 127 and its inner end is slidable in a slot 128 in the casing wall, the sides of the slot closely engaging the pin except at its ends, where it is enlarged as at 128ᵃ so as to receive a shoulder 129 adjacent the end of the pin which is provided with a head 130 to prevent disengagement of the pin from the slot. A spring 131 is provided between the casing wall and the finger piece 127 of the pin so that the latter is normally retained in its outermost position with shoulder 129 in locking engagement with the slot at one of its enlarged ends. By pressing the pin inwardly, its shoulder may be released from the slot and it may then be shifted from one end of the slot toward the other. Such movement of finger-piece 127 shifts plate 125 and plate 122. The latter carries an arm 133 adjacent the end of which is a stud 134 carrying spaced leaf springs 135 bearing at their other ends against opposite sides of a stop pin 136 on plate 122. The springs embrace a stud 137 on plate 119, forming a yielding resilient actuating connection between plates 122 and 119 for shifting the latter toward the right or left, as illustrated in Figure 17. Such movement of plate 119, of course, shifts finger 117 and disc 109ᵃ in the manner described except that when the shifting movement of the latter toward the piston rod is temporarily restrained by hook 112, finger-piece 127 is shifted and locked in the opposite end of slot 128, thereby placing one of the springs 135 under tension as shown in Figure 17, to shift the finger and disc 109ᵃ as soon as the latter is released by the hook. The position of the parts after such release is shown in Figure 18. The same delayed shifting of plate 119 and finger 117 by the resilient means described occurs also when finger-piece 127 is moved in the opposite direction, or toward the left in Figure 17, and when corresponding movement of disc 109ᵃ is temporarily restrained by the means which will now be described.

Just as the shifting movement of disc 109ᵃ toward the piston rod, or into the path of pin 111 on the latter, is temporarily restrained by hook 112 until the proper time with reference to the action of the rest of the mechanism, as will presently appear, so its shifting movement out of the path of pin 111 is also temporarily restrained by means comprising a latch bar 138 pivotally secured to the upper edge of plate 119, Figures 9 and 17, by a screw 139. The latch is formed with a spur 140 adapted upon movement toward the left to engage a pin 154 in the piston rod, and a spring 141 on plate 119 urges the latch forward into position to engage the pin, in which direction its movement is limited by contact of the tail 142 of the latch with a stop pin 143 on the plate. The outer or left hand end of the latch bar is also arranged when in its forward position to engage the arm 144 of a bell crank lever 145 pivotally secured by means of a screw 146 on a post 147 on the base, the other arm of the lever being pivotally connected by a pin 148 with a link 149, Figures 7 and 12, pivotally connected in turn at 150 with the lever 52 previously described as supporting and controlling the worm 55 which drives and releases gear 56 of the ratio indicating mechanism. A spring 151 secured to lever 145 and to a stud 152 on a post 153 on the base, normally holds the lever in such position as to maintain the worm in mesh with the gear and arm 144 of the lever in the path of the longitudinal movement of the latch bar.

The above shifting mechanism has for its purpose the selective change of the unit of fuel measure from one-tenth of a gallon to a gallon, or vice versa, it being more convenient at times to employ the smaller unit and thereby obtain more frequent indications of the miles per gallon ratio. As has been explained, the piston is reciprocated after the consumption of each tenth of a gallon of fuel. Assuming that finger-piece 127 is in its right hand position and disc 109$^a$ in its corresponding position in the path of pin 111 on the piston rod, then the latter makes a partial stroke only as each tenth of a gallon of fuel is used, sufficient to rotate the disc by the pawl and ratchet means described, but insufficient to actuate the ratio mechanism, until ten short strokes have been made and the disc rotated to bring its notch in the path of the pin. A gallon of fuel having then been supplied to the motor, the piston makes a full stroke and effects an indication by the ratio mechanism of the rate in miles per gallon at which the vehicle is travelling.

Figure 7:
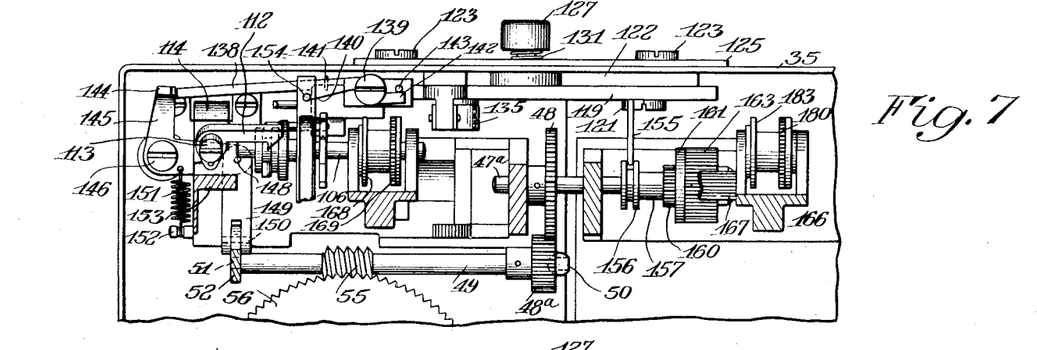
Figures 7 and 8 are views similar to Figure 6 showing the parts in different operating positions.
Figure 8:
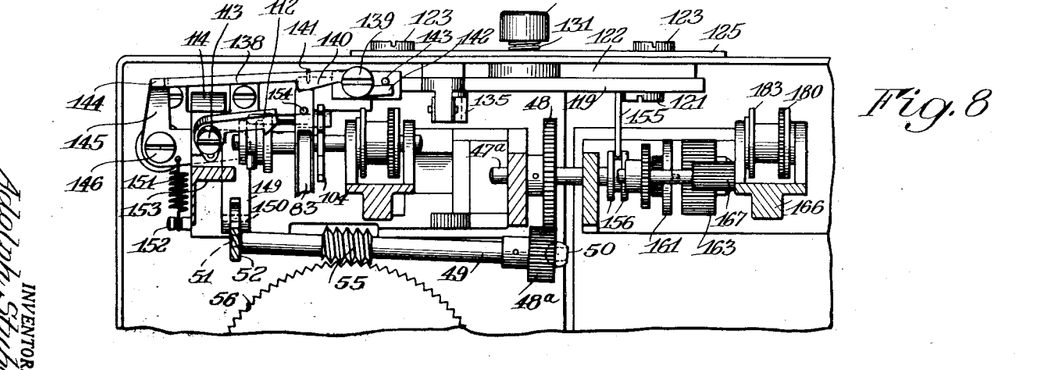

Should it be desired to effect such indication upon the consumption of each tenth of a gallon, finger-piece 127 is shifted toward the left to slide disc 109$^a$ out of the path of pin 111 and permit a full stroke of the piston and an indication to be made upon the consumption of each tenth of a gallon. At the same time, a change speed gearing is shifted to multiply by ten the speed at which the worm 55 of the ratio mechanism is driven, as explained hereinafter, in order that the ratio may still be uniformly expressed, for convenience, in miles per gallon, but indicated ten times as often, with each tenth of a gallon as the actual unit of measure. If the disc were permitted to be shifted immediately, however, by finger-piece 127, out of the path of pin 111, after the consumption of an indefinite fraction of a gallon, an incomplete and erroneous indication would obviously be made. The construction described therefore provides for the proper delay in the sliding of disc 109$^a$ out of the path of the piston rod pin through the yielding spring actuation of the latch bar 138 by the finger-piece and the engagement of spur 140 on the bar with pin 154 on the piston rod which is normally in its outer position, as shown in Figure 7. The latch bar therefore cannot be moved until released by the next inward reciprocation of the piston, when the bar moves longitudinally toward the left and engages with its end the lever 145 which is thus swung to move worm 55 out of mesh with and to release gear 56 of the ratio mechanism so that the later returns to zero position. Lever 145, however, prevents the latch bar from moving fully to the left, Figure 8, so that disc 109$^a$ prevents a full stroke of the piston and leaves unchanged the previous indication. Upon its return outward piston rod pin 111, engaging the latch bar, moves the latter out of engagement with lever 145, as in Figure 5, and the bar thereby completes its movement and that of disc 109$^a$, and at the same time shifts the driving gearing described later on, so that gear 56 is rotated at the proper speed for an indication on the consumption of the next tenth of a gallon. Such indication is then correctly made upon the next and each succeeding stroke of the piston rod.

Should it be desired thereafter to shift back to indications based on the whole gallon, finger-piece 127 is shifted toward the right to place a tension on finger 117 and disc 109$^a$ for sliding the latter back into the path of pin 111, and also to shift the change speed gearing. The disc and gearing are not shifted immediately, however, as to do so would render the rotational registration made on gear 56 a composite of rotation imparted by both positions of the change speed gearing, and otherwise produce an indication for the first full gallon which would be incomplete and erroneous. Hook 112 is therefore provided to hold the disc until its notch 110 comes into register therewith and with pin 111, when the disc is shifted, and the speed gearing set, and registration with the gallon as a unit begun.

Figure 3:
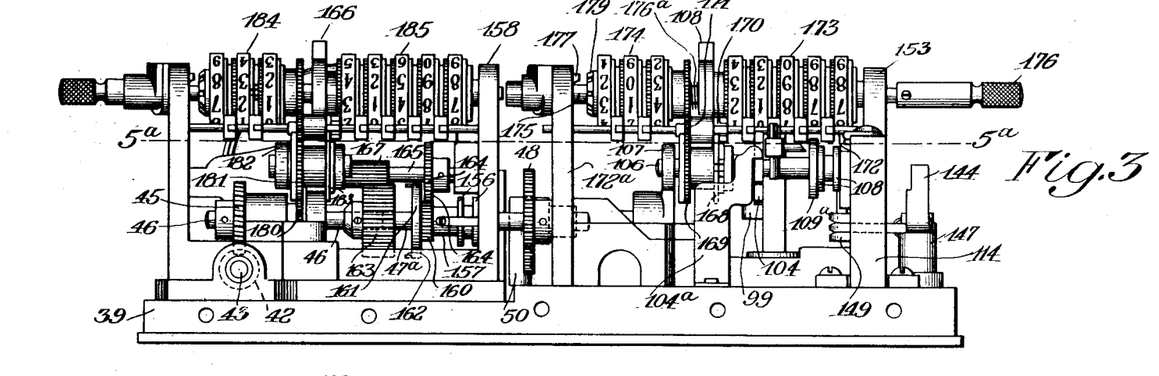
Figure 3 shows the operating parts of the mechanism as viewed from the top with the casing removed.
Figure 4:
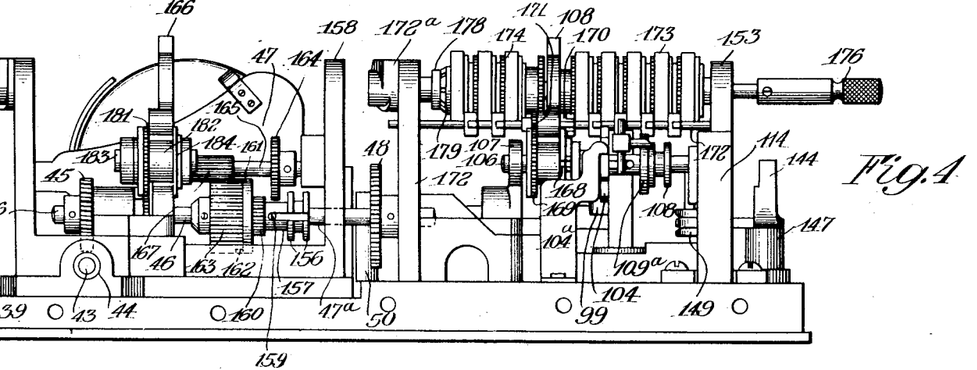
Figure 4 is a similar view with part of the indicating devices removed to better show the actuating parts therefor which are illustrated in a position different from that of Figure 3.
Figure 19:
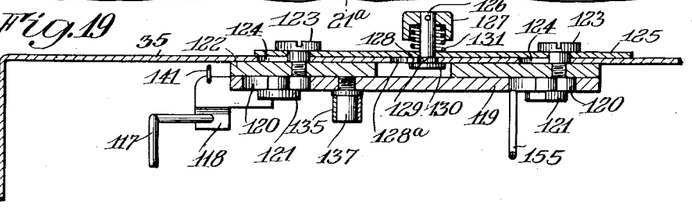
Figure 19 is a section on the line 19ª—19ª of Figure 18.
Figure 20:
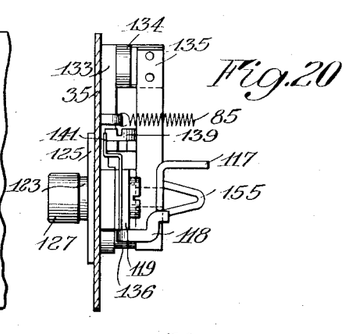
Figure 20 is a section on the line 20ª—20ª of Figure 17.
Figure 21:
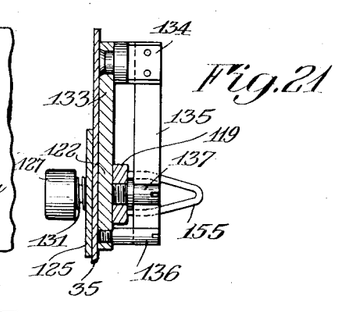
Figure 21 is a section on the line 21ª—21ª of Figure 18.
Figure 22:
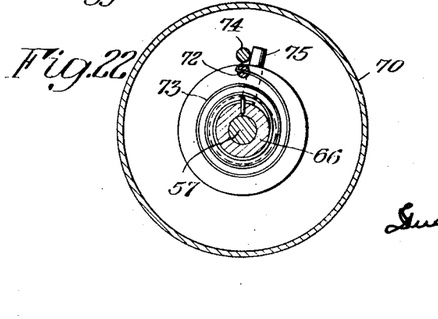
Figure 22 is a section on the line 22—22 of Figure 13.

The change speed gearing referred to as varying the speed of the worm driving the ratio indicating mechanism in conjunction with the variation of the unit of fuel measure comprises a second finger 155 on plate 119, Figures 7 and 19, projecting into engagement with a groove in a disc 156 fixed on a sleeve 157 splined at 159 on shaft 47$^a$ which carries the gear wheel 48, as previously described, and is journaled at one end in a post 158 on the base and at its other end in a bearing in the hub of a gear 163 described later on as fixed on the shaft 46, Figures 3 and 4. Fixed on the other end of sleeve 157 is a gear 160 and also a clutch disc 161 having teeth arranged to engage as at 162 in recesses in a gear 163 fixed on the shaft 46. Gear 160 is arranged to be shifted by sliding movement of sleeve 157 into and out of mesh with a gear 164 fixed on a shaft 165 journaled in the post 158 and in a post 166 on the base. Fixed on shaft 165 also is a gear 167 driven by the gear 163 on shaft 46. When grooved disc 156 is in the left hand position of Figure 4, shaft 47$^a$ is directly connected with shaft 46, and driven thereby at the same speed. When the disc is shifted to the right hand position of Figure 3, shaft 47ᵃ is driven by shaft 46 through the change speed gears, which have such a combined ratio as to drive shaft 47ᵃ ten times faster than shaft 46. From this construction, it is apparent that as plate 119 and disc 109ᵃ are yieldably shifted by finger-piece 127 toward the right, Figure 3, to vary the fuel unit from a gallon to a tenth of a gallon, disc 156 is also shifted simultaneously in the same direction by the same means to multiply by ten the speed at which the ratio indicating mechanism is driven so as still to indicate the ratio in terms of miles per gallon of fuel.

In conjunction with the above ratio indicating mechanism, there are provided mechanisms for registering the total number of gallons of fuel consumed and also the number of gallons remaining in the main supply reservoir. Such mechanisms comprise a pair of gears 168 and 169 fixed on shaft 106, Figure 3, meshing with pinions 170 and 171, respectively, rotating on a spindle 172 carried by a post 172ᵃ and the posts 108 and 153 on the base. Gear 168 is mutilated in construction so that a complete revolution thereof rotates by means of pinion 170, through one-tenth of a revolution the first of a series of accumulator wheels or counters 173 for indicating the total number of whole gallons of fuel consumed. Gear 169, by means of gearing including pinion 171, rotates the first of a series of accumulator wheels or counters 174, for indicating in whole gallons and tenths of a gallon, the quantity of fuel remaining in the main reservoir. As gears 168 and 169 are rotated by the partial as well as the full strokes of the piston rod, and as the figures on the wheels 174 are reversed from those on wheels 173, it is apparent that the latter are additively driven to accurately register the fuel consumed, while wheels 174 are subtractively driven to indicate the fuel remaining in the reservoir. Wheels 173 and 174 are slidably and rotatively carried on a shaft 175 slidably supported in posts 153 and 172ᵃ and which is provided with a finger-piece 176 by means of which it may be moved longitudinally to bring a tooth 177 on a collar 178 thereon into engagement with recesses in a collar 179 connected with the wheels, the latter being shifted against the pressure of a spring 176ᵃ to disconnect them from pinion 171, after which wheels 174 may be manually reset by the finger-piece as when fuel is supplied to the reservoir.

The usual mechanisms for indicating the total and trip mileage accomplished are driven by a gear 180 on shaft 46, meshing with a gear 181 on a sleeve 182 rotatably carried on post 166 and having fixed thereon a second gear 183. Gears 181 and 183 drive by means of the usual or any suitable connections, the series of accumulator wheels 184 and 185 usually provided for registering and indicating the mileage accomplished.

The operation of the device is apparent from the explanation thereof made in connection with the description of its construction. The driving member or worm 55 actuating the controller or gear 56 of the ratio indicating mechanism is constantly driven by the motor for imparting a rotational setting to gear 56 during the consumption of each fuel unit corresponding to the mileage accomplished. After the consumption of each such unit piston rod 83 is reciprocated by the pneumatic means described, to momentarily release the indicator or dial 71 which is moved to a new indicating posititon determined by the setting of gear 56. The latter is then momentarily disconnected from its driving worm and returned to initial position for rotation to a new setting during the consumption of the next fuel unit. The indication of the ratio is conveniently varied by means of finger-piece 127 to correspond with the consumption of either a tenth, or of a whole gallon of fuel as may be desired. The pneumatic means also operates in the manner described the register for indicating at all times the total fuel consumed and the amount remaining in the main reservoir.

The indication of the mileage accomplished per unit of fuel consumed is not only an attractive and interesting feature for motor vehicles, but is also exceedingly useful to show the operating condition of the motor and the quality of the fuel, and thus improves the efficiency and therefore the economy of operation. The mechanism is efficiently constructed and economically and conveniently arranged for application to the instrument board of a motor vehicle.

I claim as my invention:

1. The combination of an internal combustion engine, a fluid fuel feeding system therefor comprising a fluid measuring device, and mechanism for registering the relation of work performed to fuel supplied comprising indicating means having a driving connection with the engine, a controlling connection with said fluid feeding system for periodically controlling said driving connection in accordance with the feeding of measured fluid units, adjustable means for selectively varying the frequency of said periodical control for varying the fluid unit employed, and a device for coordinating the operation of said indicating means in accordance with the variation of the fluid unit by said adjustable means.

2. The combination of a fuel consuming engine, fuel feeding means therefor comprising a source of fuel, and registering mechanism for indicating the amount of work performed by the engine for a corresponding quantity of fuel supplied comprising a variable connection between said engine and mechanism for driving the latter at different speeds, and also a connection between said fuel feeding means and mechanism variable in accordance with variation of said driving connection for controlling the registering mechanism to effect indications corresponding to the supply of different quantities of fuel.

3. The combination of a fuel consuming engine, a source of fuel therefor, fuel feeding means for supplying fuel from said source to the engine comprising a measuring device, and registering mechanism for registering the relation of work performed to fuel supplied comprising a driving connection with the engine having speed changing means, a controlling connection with said fuel feeding means for periodically controlling said driving connection in accordance with the feeding of measured fuel units, and adjustable means for selectively varying the fuel unit employed and varying correspondingly said speed changing means.

4. The combination of a fuel consuming engine, fuel feeding means therefor comprising a source of fuel, registering mechanism for indicating the relation of work performed by the engine to the corresponding quantity of fuel supplied, a driving connection between said engine and mechanism comprising change speed gearing for driving said mechanism at different speeds, a controlling connection between said fuel feeding system and mechanism comprising a stop device for periodically actuating said mechanism in accordance with the supply of different quantities of fuel, and adjustable means for shifting said gearing and stop device to vary the frequency of the periodic indications.

5. The combination of a fuel consuming engine, a fuel feeding system therefor comprising a source of fuel and a fuel measuring device, registering mechanism for indicating the relation between the amount of work performed by the engine and the corresponding quantity of fuel supplied comprising driving connections with the engine provided with a speed changing device, a connection with said fuel system provided with devices for effecting indications corresponding to the supply of measured quantities of fuel to the engine, adjustable stop means for said devices for varying the unit of fuel measure, and variable means for selectively adjusting said speed changing device and stop means to effect in uniform terms indications based on different fuel units.

6. The combination of a fuel consuming engine, a fuel measuring and feeding system therefor, mechanism having a variable driving connection with the engine and comprising variably controlled devices for indicating the relation of the amount of work performed by the engine to the corresponding quantity of fuel consumed thereby, an adjustable stop for said devices shiftable toward and from operative position and adapted to limit the movement of said devices for a plurality of operations thereof and thereafter permit an unrestrained movement thereof and adjustable means controlling said driving connection and shifting said stop for effecting, selectively, indications corresponding to the supply of different fuel units.

7. The combination of a fuel consuming engine, a fuel measuring and feeding system therefor, mechanism having a variable driving connection with the engine and comprising variably controlled devices for indicating the relation of the amount of work performed by the engine to the corresponding quantity of fuel consumed thereby, an adjustable stop for said devices shiftable toward and from operative position and adapted to limit the movement of said devices for a plurality of operations thereof, and thereafter permit an unrestrained movement thereof and an adjustable device provided with means producing a delayed, coordinating action thereof for controlling said driving connection and shifting said stop to effect, selectively indications corresponding to the supply of different fuel units.

8. A registering mechanism comprising an indicator, driving means for said indicator provided with a speed changing device, means for controlling said indicator and driving means to effect an indication, a device adapted to intermittently restrain the action of said controlling means, and adjustable means for adjusting said speed changing device and said restraining device to effect comparative indications of different quantities measured in selectively variable units.

9. A registering mechanism comprising an indicator, driving means for said indicator provided with change speed gearing, means for intermittently controlling said indicator and driving means to effect an indication, an adjustable stop for selectively varying said intermittent action of said controlling means and manually operative means for adjusting said speed changing device and said stop to effect comparative indications of different quantities measured in selectively variable units.

10. A registering mechanism comprising an indicator, driving means for said indicator provided with a speed changing device, means for intermittently controlling said indicator and driving means to effect an indication, an adjustable restraining device driven by said controlling means for selectively varying said intermittent control by said controlling means, and manually operative means for adjusting said speed changing device and said restraining device to effect comparative indications of different quantities measured in selectively variable units.

11. A registering mechanism comprising an indicator, driving means for said indicator provided with a speed changing device, means for controlling said indicator and driving means to effect an indication, a device adapted to intermittently restrain the action of said controlling means, adjustable means for adjusting said speed changing device and said restraining device to effect comparative indications of different quantities measured in selectively variable units, and resilient means adapted to effect delayed coordinated action between said adjustable means and the parts adjusted thereby.

12. A registering mechanism comprising a movable indicator, means for setting said indicator, driving means for said setting means having speed changing means, intermittently operating means controlling the movement of said indicator and of said setting means to effect indications, and a shiftable stop device for adjusting said speed changing means and said intermittently operating means to effect comparative indications of different quantities measured in selectively variable units.

13. A registering mechanism comprising indicating means, driving means for said indicating means, devices effecting periodical setting of said indicating means, stop means driven by said setting devices and adjustable for varying the frequency of setting of said indicating means, and a device for coordinating the operation of said indicating means in accordance with said variation in the frequency of setting of the same.

14. A registering mechanism comprising indicating means, driving means for said indicating means, devices comprising a reciprocating part for effecting periodical setting of said indicating means, stop means driven by said reciprocating part and movable to and from operative position for varying the frequency of setting of said indicating means, and a device for coordinating the operation of said indicating means in accordance with said variation in the frequency of setting of the same.

15. A registering mechanism comprising indicating means, driving means for said indicating means, devices comprising a reciprocating part for effecting periodical setting of said indicating means, stop means driven by said reciprocating part and movable to and from operative position for varying the frequency of setting of said indicating means, and a speed changing device connected with said driving means for coordinating the operation of said indicating means in accordance with said variation in the frequency of setting of the same.

16. A registering mechanism comprising indicating means, driving means for said indicating means, devices comprising a reciprocating part for effecting periodical setting of said indicating means, adjustable stop means having a pawl and ratchet connection with said reciprocating part for varying the frequency of setting of said indicating means, an adjustable device for coordinating the operation of said indicating means in accordance with said variation in the frequency of setting of the same, and manually operable means for adjusting said stop means and coordinating device.

17. A registering mechanism comprising indicating means, driving means for said indicating means, devices comprising a reciprocating part for effecting periodical setting of said indicating means, adjustable stop means having a pawl and ratchet connection with said reciprocating part for varying the frequency of setting of said indicating means, adjustable speed changing gearing connected with said driving means for coordinating the operation of said indicating means in accordance with said variation in the frequency of setting of the same, and manually operable means for adjusting said stop means and gearing.

18. A registering mechanism comprising indicating means, driving means for said indicating means, devices effecting periodical setting of said indicating means, adjustable means driven by said setting devices for varying the frequency of setting of said indicating means, an adjustable device for coordinating the operation of said indicating means in accordance with said variation in the frequency of setting thereof, and a manually adjustable element provided with resilient means for effecting operation of said adjustable means and adjustable device in delayed coordinated action with the parts of said mechanism controlled thereby.

ADOLPH STUBER.